(12) United States Patent
Hill et al.

(10) Patent No.: US 10,936,936 B2
(45) Date of Patent: Mar. 2, 2021

(54) SYSTEMS AND METHODS FOR INTELLIGENTLY CONFIGURING AND DEPLOYING A CONTROL STRUCTURE OF A MACHINE LEARNING-BASED DIALOGUE SYSTEM

(71) Applicant: Clinc, Inc., Ann Arbor, MI (US)

(72) Inventors: Parker Hill, Ann Arbor, MI (US); Jason Mars, Ann Arbor, MI (US); Lingjia Tang, Ann Arbor, MI (US); Michael A. Laurenzano, Ann Arbor, MI (US); Johann Hauswald, Ann Arbor, MI (US); Yiping Kang, Ann Arbor, MI (US); Yunqi Zhang, Ann Arbor, MI (US)

(73) Assignee: Clinc, Inc., Ann Arbor, MI (US)

(*) Notice: Subject to any disclaimer, the term of this patent is extended or adjusted under 35 U.S.C. 154(b) by 0 days.

(21) Appl. No.: 16/682,081

(22) Filed: Nov. 13, 2019

(65) Prior Publication Data
US 2020/0193265 A1 Jun. 18, 2020

Related U.S. Application Data

(60) Provisional application No. 62/779,945, filed on Dec. 14, 2018.

(51) Int. Cl.
*G06N 3/00* (2006.01)
*G06N 20/00* (2019.01)
(Continued)

(52) U.S. Cl.
CPC .......... *G06N 3/006* (2013.01); *G06F 16/3329* (2019.01); *G06F 40/30* (2020.01);
(Continued)

(58) Field of Classification Search
CPC .......... G06N 20/00; G06N 3/006; G06N 5/04; G10L 15/22; G06F 3/0482; G06F 8/34
See application file for complete search history.

(56) References Cited

U.S. PATENT DOCUMENTS 7,606,714 B2 10/2009 Williams et al.
8,606,575 B1 * 12/2013 Witt-ehsani ........ G10L 15/1822
704/235

(Continued)

OTHER PUBLICATIONS

Kang et al., "Hierarchical speech-act classification for discourse analysis," Pattern Recognition Letters, vol. 34, No. 10, pp. 1119-1124, 2013 (Year: 2013).*

*Primary Examiner* — Baboucarr Faal
*Assistant Examiner* — Yao D Huang
(74) *Attorney, Agent, or Firm* — Padowithz Alce

(57) ABSTRACT

A system and method of configuring a graphical control structure for controlling a machine learning-based automated dialogue system includes configuring a root dialogue classification node that performs a dialogue intent classification task for utterance data input; configuring a plurality of distinct dialogue state classification nodes that are arranged downstream of the root dialogue classification node; configuring a graphical edge connection between the root dialogue classification node and the plurality of distinct state dialogue classification nodes that graphically connects each of the plurality of distinct state dialogue classification nodes to the root dialogue classification node, wherein (i) the root dialogue classification node, (ii) the plurality of distinct classification nodes, (iii) and the transition edge connections define a graphical dialogue system control structure that governs an active dialogue between a user and the machine learning-based automated dialogue system.

17 Claims, 5 Drawing Sheets

(51) Int. Cl.
- *G06N 5/04* (2006.01)
- *G06F 40/30* (2020.01)
- *G06F 16/332* (2019.01)
- *G06K 9/62* (2006.01)
- *G10L 15/18* (2013.01)
- *G10L 15/22* (2006.01)

(52) U.S. Cl.
CPC ............ *G06K 9/6215* (2013.01); *G06N 5/04* (2013.01); *G06N 20/00* (2019.01); *G10L 15/1815* (2013.01); *G10L 15/22* (2013.01)

(56) References Cited

U.S. PATENT DOCUMENTS

| | | |
|---|---|---|
| 2009/0306995 A1 | 12/2009 | Weng et al. |
| 2011/0208526 A1* | 8/2011 | Pieraccini ............... G10L 15/22 704/251 |
| 2014/0365226 A1 | 12/2014 | Sinha |
| 2015/0186155 A1 | 7/2015 | Brown et al. |
| 2016/0078866 A1 | 3/2016 | Gelfenbeyn et al. |
| 2016/0260029 A1 | 9/2016 | Gelfenbeyn et al. |
| 2017/0061257 A1* | 3/2017 | Yang .................... G06K 9/6267 |
| 2017/0180284 A1* | 6/2017 | Smullen ................. H04L 69/14 |
| 2017/0199867 A1 | 7/2017 | Koji et al. |
| 2018/0024510 A1* | 1/2018 | Matsushima ........ G05B 13/027 700/48 |
| 2018/0308481 A1 | 10/2018 | Cohen et al. |
| 2019/0103095 A1* | 4/2019 | Singaraju ............... G06N 20/10 |
| 2019/0115027 A1 | 4/2019 | Shah et al. |
| 2019/0130904 A1 | 5/2019 | Homma et al. |
| 2019/0228107 A1* | 7/2019 | Trim ....................... H04L 51/02 |

* cited by examiner

Configuring a Root Node S210

Configuring State Nodes S220

Configuring Transitional Edges S230

Configuring Logic Operations S235

Deploying the Machine Learning Control Structure S240

FIGURE 2

SYSTEMS AND METHODS FOR INTELLIGENTLY CONFIGURING AND DEPLOYING A CONTROL STRUCTURE OF A MACHINE LEARNING-BASED DIALOGUE SYSTEM

CROSS-REFERENCE TO RELATED APPLICATIONS

This application claims the benefit of U.S. Provisional Application No. 62/779,945, filed 14 Dec. 2018, which is incorporated in its entirety by this reference.

GOVERNMENT RIGHTS

The subject matter of the invention may be subject to U.S. Government Rights under National Science Foundation grants: NSF SBIR Phase 1 Grant-1622049 and NSF SBIR Phase 2 Grant-1738441.

TECHNICAL FIELD

The inventions herein relate generally to the machine learning and artificially intelligent dialogue systems fields, and more specifically to a new and useful system and method for intelligently controlling a machine learning-based conversational service in the machine learning field.

BACKGROUND

Modern virtual assistants and/or online chatbots may typically be employed to perform various tasks or services based on an interaction with a user. Typically, a user interacting with a virtual assistant may pose a question or otherwise submit a command to the virtual assistant to which the virtual assistant may provide a response or a result. Many of these virtual assistants may be implemented using a rules-based approach, which typically requires coding or preprogramming many or hundreds of rules that may govern a manner in which the virtual assistant should operate to respond to a given query or command from a user.

While the rules-based approach for implementing a virtual assistant may be useful for addressing pointed or specific queries or commands made by a user, the rigid or finite nature of this approach severely limits a capability of a virtual assistant to address queries or commands from a user that exceed the scope of the finite realm of pointed and/or specific queries or commands that are addressable by the finite set of rules that drive the response operations of the virtual assistant.

That is, the modern virtual assistants implemented via a rules-based approach for generating responses to users may not fully satisfy queries and commands posed by a user for which there are no predetermined rules to provide a meaningful response or result to the user.

Additionally, while machine learning enhances capabilities of artificially intelligent conversational systems, inefficiencies continue to persist in the underlying control structures used for controlling the underlying machine learning models performing classification and predictive functions of the artificially intelligent conversation systems.

Therefore, there is a need in the machine learning field for systems and methods that enable a configuring of a dynamic dialogue system control structure that is capable of evolving to handle simple or complex conversations between a virtual dialogue agent and a user. The embodiments of the present application described herein provide technical solutions that address, at least, the need described above, as well as the deficiencies of the state of the art described throughout the present application.

BRIEF SUMMARY OF THE INVENTION(S)

In one embodiment, a method of configuring a graphical control structure for controlling a machine learning-based automated dialogue system includes configuring a root dialogue classification node that performs a dialogue intent classification task for utterance data input to a machine learning-based automated dialogue system; configuring a plurality of distinct dialogue state classification nodes that are arranged downstream of the root dialogue classification node, wherein each of the plurality of distinct dialogue state classification nodes performs a distinct dialogue classification task for a distinct dialogue intent based on the utterance data; configuring a graphical edge connection between the root dialogue classification node and each of the plurality of distinct state dialogue classification nodes that graphically connects each of the plurality of distinct state dialogue classification nodes to the root dialogue classification node thereby enabling a dialogue path from the root node downstream to each of the plurality of distinct state dialogue classification nodes, wherein (i) the root dialogue classification node, (ii) the plurality of distinct classification nodes, (iii) and the transition edge connection between the root dialogue classification node and each of the plurality of distinct dialogue classification nodes define a graphical dialogue system control structure that governs an active dialogue between a user and the machine learning-based automated dialogue system.

In one embodiment, the root dialogue classification node comprises a single machine learning model that is trained to perform multiple distinct dialogue intent classification tasks that produces an intent classification prediction based on the input of the utterance data that aligns with a distinct dialogue intent competency of one of the plurality of distinct dialogue classification nodes downstream of the root dialogue classification node.

In one embodiment, the method includes traversing the dialogue between the user and the machine learning-based automated dialogue system from the root dialogue classification node downstream to a distinct one of the plurality of distinct dialogue classification nodes based on the intent classification prediction.

In one embodiment, the root dialogue classification node comprises an ensemble of distinct machine learning models, each of the distinct machine learning models being trained to perform a distinct dialogue intent classification tasks, wherein the ensemble produces multiple distinct intent classification predictions including a distinct intent classification prediction for each one of the plurality of distinct dialogue classification nodes downstream of the root dialogue classification node.

In one embodiment, the method includes traversing the dialogue between the user and the machine learning-based automated dialogue system from the root dialogue classification node downstream to a distinct one of the plurality of distinct dialogue classification nodes based on identifying which distinct intent classification prediction as having a highest level of confidence.

In one embodiment, the method includes re-classifying, by the root dialogue classification node, the active dialogue between the user and the machine learning-based automated dialogue system based on a reversion of the active dialogue from one state dialogue classification node of the plurality of distinct state dialogue classification nodes arranged downstream of the root dialogue classification node.

In one embodiment, the root dialogue classification node re-classifies the active dialogue from the one state dialogue classification node to a second distinct state dialogue classification node of the plurality of distinct state dialogue classification node. of the dialogue intent competency of the reverting state node.

In one embodiment, the one state dialogue classification node reverts the active dialogue to the root classification node based on computing a misalignment between dialogue intent capabilities of the one state dialogue classification node and an identified current dialogue intent of one or more utterances from the user.

In one embodiment, the method includes a plurality of distinct dialogue competency sub-networks, wherein each of the plurality of distinct dialogue competency sub-networks: separately extends from the root dialogue classification node via one graphical edge connection, includes a progenitor node comprising a distinct one of the plurality of distinct state dialogue classification nodes, wherein one or more sub-dialogue intent nodes are arranged downstream and extend from the progenitor node.

In one embodiment, the each of the plurality of distinct dialogue competency sub-networks have a hierarchical structure in which: the progenitor node defining a top layer of the hierarchical structure is configured with coarse capabilities to perform dialogue intent classification tasks for generating predictions identifying one or more multiple distinct sub-intents of a single dialogue competency or single dialogue category, the one or more sub-dialogue intent nodes defining one or more subsequent layers from the progenitor node is configured with granular capabilities to perform dialogue intent classification for at least a distinct one of the multiple distinct sub-intents.

In one embodiment, the method includes if a misalignment between a computed dialogue intent of an utterance of a user and a dialogue classification capability of a sub-dialogue intent classification node of a first distinct sub-network of the plurality of distinct dialogue competency sub-networks is detected, configuring the machine learning-based dialogue system to pass, in a jumping manner without a graphical edge connection, the active dialogue from the first distinct sub-network to a second distinct sub-network having the dialogue classification capability matching the dialogue intent of the user.

In one embodiment, the method includes configuring a classification transition edge connection, wherein the classification transition edge connection relates to a graphical transition connection between at least a pair of distinct state classification nodes indicating that a machine learning classification prediction has been generated by an originating node of the pair enabling an active dialogue between the user and the machine learning-based dialogue system to pass from the originating node to a destination node of the pair.

In one embodiment, the method includes configuring a slot transition edge connection, wherein the slot transition edge connection relates to a graphical transition connection between at least a pair of distinct state classification nodes indicating that one or more slot classification values of an active dialogue between the user and the machine learning-based dialogue system which are passed pass from the originating node to a destination node of the pair.

In one embodiment, the method includes configuring an update transition loop connection, wherein the update transition loop connection relates to a graphical transition connection that graphically originates at a distinct state classification node and that loops back into the distinct state classification node indicating an action to be performed by the distinct state classification node for obtaining additional information beyond an initial utterance from the user to the distinct state classification node.

In one embodiment, the method includes configuring a logic transition edge connection, wherein the logic transition edge connection relates to a graphical logical transition connection between at least a pair of distinct state classification nodes indicating that enables an execution or a completion of one or more business tasks for generating a response to dialogue input from the user.

In one embodiment, the method includes setting an archetype that is selected from a plurality of distinct archetypes for each of the one or more new dialogue competencies of the target dialogue system based on attributes of mishandled utterance data within a target corpus of mishandled utterances of the one or more distinct corpora of mishandled utterances.

In one embodiment, the method includes deploying the graphical dialogue system control structure to control an operation of each of the root dialogue classification nodes and each of the plurality of distinct state dialogue classification nodes for implementing an artificially intelligent dialogue agent that interfaces with the user in a live dialogue.

In one embodiment, the dialogue system control structure relates to a graphically based structure that governs an operation of and communication between multiple machine learning models and dialogue response generating components of the machine learning-based dialogue system.

In one embodiment, a system for intelligently configuring a graphical control structure for controlling a machine learning-based automated dialogue system, the system comprising: a web-based user interface for configuring a graphical dialogue system control structure that is in operable communication a remote machine learning-based dialogue service and that: configures a root dialogue classification node that performs a dialogue intent classification task for utterance data input to a machine learning-based automated dialogue system; configures a plurality of distinct dialogue state classification nodes that are arranged downstream of the root dialogue classification node, wherein each of the plurality of distinct dialogue state classification nodes performs a distinct dialogue classification task for a distinct dialogue intent based on the utterance data; configures a graphical edge connection between the root dialogue classification node and each of the plurality of distinct state dialogue classification nodes that graphically connects each of the plurality of distinct state dialogue classification nodes to the root dialogue classification node thereby enabling a dialogue path from the root node downstream to each of the plurality of distinct state dialogue classification nodes, wherein (i) the root dialogue classification node, (ii) the plurality of distinct classification nodes, (iii) and the transition edge connection between the root dialogue classification node and each of the plurality of distinct dialogue classification nodes define the graphical dialogue system control structure that governs an active dialogue between a user and the machine learning-based automated dialogue system.

In one embodiment, the graphical dialogue system control structure further includes: a plurality of distinct dialogue competency sub-networks, wherein each of the plurality of distinct dialogue competency sub-networks: separately extends from the root dialogue classification node via one graphical edge connection, includes a progenitor node comprising a distinct one of the plurality of distinct state dialogue classification nodes, wherein one or more sub-dialogue intent nodes are arranged downstream and extend from the progenitor node.

BRIEF DESCRIPTION OF THE FIGURES

FIG. 2 illustrates an example method in accordance with one or more embodiments of the present application;

DESCRIPTION OF THE PREFERRED EMBODIMENTS

Figure 1:
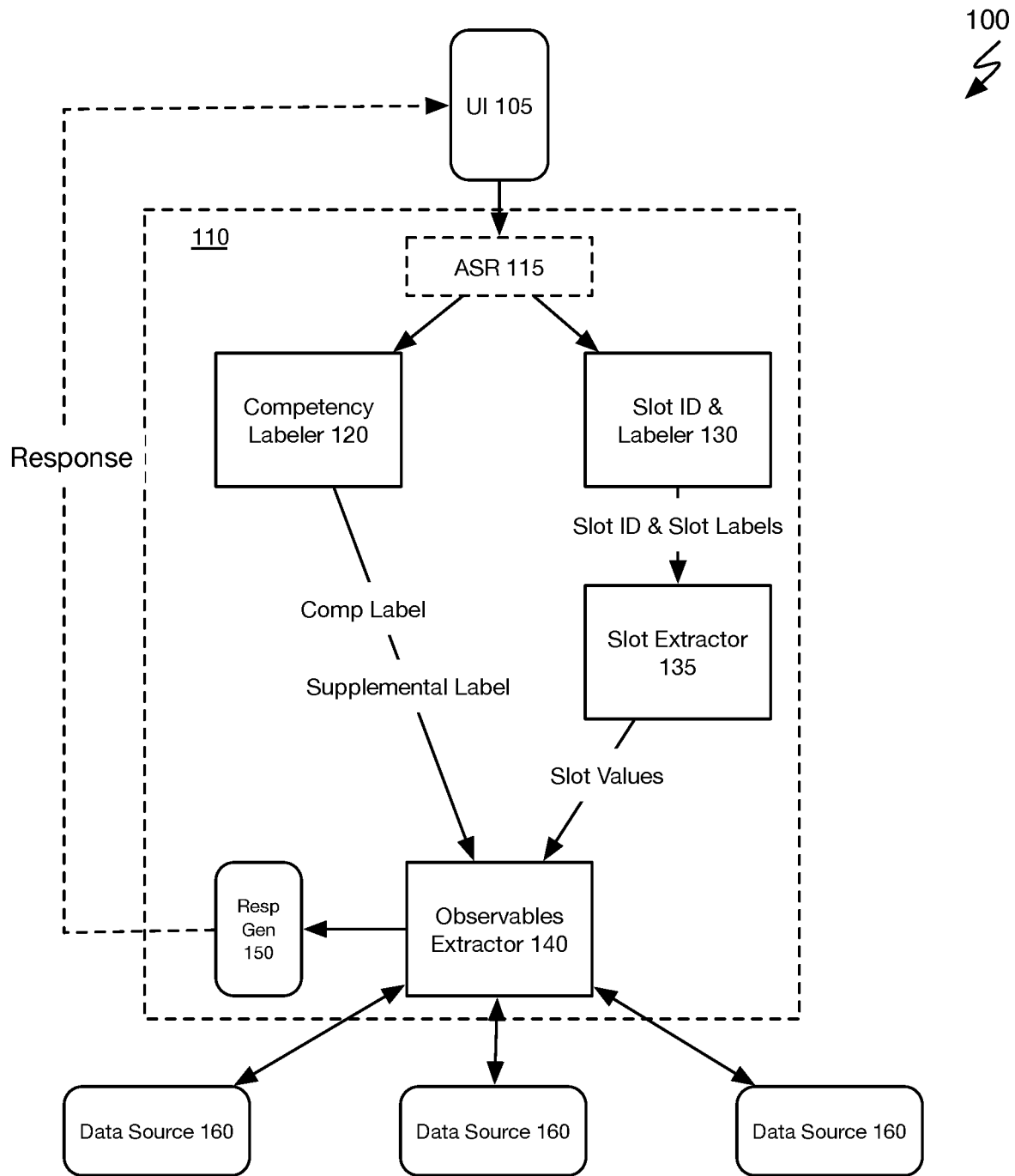
FIG. 1 illustrates a schematic representation of a system 100 in accordance with one or more embodiments of the present application.

The following description of the preferred embodiments of the present application are not intended to limit the inventions to these preferred embodiments, but rather to enable any person skilled in the art to make and use these inventions.

Overview

As discussed above, existing virtual assistant implementations do not have the requisite flexibility to address unrecognized queries or commands from user in which there are no predetermined rules designed around narrowly defined dialogue intents. This inflexible structure cannot reasonably and efficiently address the many variances in the manners in which a user may pose a query or command to the virtual assistant.

The embodiments of the present application, however, provide an artificially intelligent machine learning-based dialogue service and/or system with natural language processing capabilities that function to process and comprehend structured and/or unstructured natural language input from a user or input from any other suitable source and correspondingly provide highly conversant responses to dialogue inputs to the system. Using one or more trained (deep) machine learning models, such as long short-term memory (LSTM) neural network, the embodiments of the present application may function to understand any variety of natural language utterance or textual input provided to the system. The one or more deep machine learning models post deployment can continue to train using unknown and previously incomprehensible queries or commands from users. As a result, the underlying system that implements the (deep) machine learning models may function to evolve with increasing interactions with users and training rather than being governed by a fixed set of predetermined rules for responding to narrowly defined queries, as may be accomplished in the current state of the art.

Accordingly, the evolving nature of the artificial intelligence platform described herein therefore enables the artificially intelligent virtual assistant latitude to learn without a need for additional programming and the capabilities to ingest complex (or uncontemplated) utterances and text input to provide meaningful and accurate responses.

Additionally, one or more embodiments of the present application enable a configuration of an evolving and dynamic control structure that functions to govern an operation and communication between multiple machine learning models and dialogue response generating components of the machine learning-based dialogue system described throughout the present application.

Accordingly, a technical benefit of one or more of these embodiments include an intelligent control of a conversation and/or dialogue between a third-party and a dialogue agent implemented by the machine learning-based dialogue system described herein. Specifically, a graphical machine learning-based control network may function to enable a control of prose and content of a response by the machine-learning based dialogue system separate or independent from controlling a flow of conversation between a user and a dialogue agent of the dialogue system.

1. System for a Machine Learning-Based Dialogue System

As shown in FIG. 1, a system 100 that automatically trains and/or configures machine learning models includes an artificial intelligence (AI) virtual assistant platform 110 (e.g., artificially intelligent dialogue platform), a machine learning configuration interface 120, a training/configuration data repository 130, a configuration data queue 135, and a plurality of external training/configuration data sources 140.

Generally, the system 100 functions to implement the artificial intelligence virtual assistant platform 110 to enable intelligent and conversational responses by an artificially intelligent virtual assistant to a user query and/or user command input into the system 100, as described in U.S. patent application Ser. No. 15/797,414, U.S. patent application Ser. No. 15/821,010, and U.S. patent application Ser. No. 16/668,559, which are all incorporated herein in their entireties by this reference. Specifically, the system 100 functions to ingest user input in the form of text or speech into a user interface 160. At natural language processing components of the system 100 that may include, at least, the competency classification engine 120 the slot identification engine 130, and a slot value extractor 135, the system 100 functions to identify a competency classification label for the user input data and parse the user input data into comprehensible slots or segments that may, in turn, be converted into program-comprehensible and/or useable features. Leveraging the outputs of the natural language processing components of the system 100, the observables extractor 140 may function to generate handlers based on the outcomes of the natural language processing components and further, execute the generated handlers to thereby perform various operations that accesses one or more data sources relevant to the query or command and that also performs one or more operations (e.g., data filtering, data aggregation, and the like) to the data accessed from the one or more data sources.

The artificial intelligence virtual assistant platform 110 functions to implement an artificially intelligent virtual assistant capable of interacting and communication with a user. The artificial intelligence platform 110 may be implemented via one or more specifically configured web or private computing servers (or a distributed computing system; e.g., the cloud) or any suitable system for implementing the system 100 and/or the method 200.

In some implementations, the artificial intelligence virtual assistant platform 110 may be a remote platform implemented over the web (e.g., using web servers) that is configured to interact with distinct and disparate service providers. In such implementation, an event such as a user attempting to access one or more services or data from one or more data sources of the service provider may trigger an implementation of the artificially intelligent virtual assistant of the AI platform 110. Thus, the AI virtual assistant platform 110 may work in conjunction with the service provider to attend to the one or more queries and/or commands of the users of the service provider. In this implementation, the data sources 160 may be data sources of the service provider that are external data sources to the AI virtual assistant platform 110.

The competency classification engine 120 together with the slot identification engine 130 and the slot value extractor 135 preferably function to define a natural language processing (NLP) component of the artificial intelligence platform 110. In one implementation, the natural language processing component may additionally include the automatic speech recognition unit 105.

The competency classification engine 120 functions to implement one or more competency classification machine learning models to label user input data comprising a user query or a user command. The one or more competency classification machine learning models may include one or more deep machine learning algorithms (e.g., a recurrent neural network, etc.) that have been specifically trained to identify and/or classify a competency label for utterance input and/or textual input. The training input used in training the one or more deep machine learning algorithms of the competency classification engine 120 may include crowdsourced data obtained from one or more disparate user query or user command data sources and/or platforms (e.g., messaging platforms, etc.). However, it shall be noted that the system 100 may obtain training data from any suitable external data sources. The one or more deep machine learning algorithms may additionally be continually trained using user queries and user commands that were misspredicted or incorrectly analyzed by the system 100 including the competency classification engine 120.

The competency classification engine 120 may additionally be configured to generate or identify one competency classification label for each user query and/or user command input into the engine 120. The competency classification engine 120 may be configured to identify or select from a plurality of predetermined competency classification labels (e.g., Income, Balance, Spending, Investment, Location, etc.). Each competency classification label available to the competency classification engine 120 may define a universe of competency-specific functions available to the system 100 or the artificially intelligent assistant for handling a user query or user command. That is, once a competency classification label is identified for a user query or user command, the system 100 may use the competency classification label to restrict one or more computer-executable operations (e.g., handlers) and/or filters that may be used by system components when generating a response to the user query or user command. The one or more computer-executable operations and/or filters associated with each of the plurality of competency classifications may be different and distinct and thus, may be used to process user queries and/or user commands differently as well as used to process user data (e.g., transaction data obtained from external data sources 160).

Additionally, the competency classification machine learning model 120 may function to implement a single deep machine learning algorithm that has been trained to identify multiple competency classification labels. Alternatively, the competency classification machine learning model 120 may function to implement an ensemble of deep machine learning algorithms in which each deep machine learning algorithm of the ensemble functions to identify a single competency classification label for user input data. For example, if the competency classification model 120 is capable of identifying three distinct competency classification labels, such as Income, Balance, and Spending, then the ensemble of deep machine learning algorithms may include three distinct deep machine learning algorithms that classify user input data as Income, Balance, and Spending, respectively. While each of the deep machine learning algorithms that define the ensemble may individually be configured to identify a specific competency classification label, the combination of deep machine learning algorithms may additionally be configured to work together to generate individual competency classification labels. For example, if the system receives user input data that is determined to be highly complex (e.g., based on a value or computation of the user input data exceeding a complexity threshold), the system 100 may function to selectively implement a subset (e.g., three machine learning algorithms from a total of nine machine learning algorithms or the like) of the ensemble of machine learning algorithms to generate a competency classification label.

Additionally, the competency classification engine 120 may be implemented by the one or more computing servers, computer processors, and the like of the artificial intelligence virtual assistance platform 110.

The slot identification engine 130 functions to implement one or more machine learning models to identify slots or meaningful segments of user queries or user commands and to assign a slot classification label for each identified slot. The one or more machine learning models implemented by the slot identification engine 130 may implement one or more trained deep machine learning algorithms (e.g., recurrent neural networks). The one or more deep machine learning algorithms of the slot identification engine 130 may be trained in any suitable manner including with sample data of user queries and user commands that have been slotted and assigned slot values and/or user system derived examples. Alternatively, the slot identification engine 130 may function to implement an ensemble of deep machine learning algorithms in which each deep machine learning algorithm of the ensemble functions to identify distinct slot labels or slot type labels for user input data. For example, slot identification engine 130 may be capable of identifying multiple distinct slot classification labels, such as Income, Account, and Date labels, then the ensemble of deep machine learning algorithms may include three distinct deep machine learning algorithms that function to classify segments or tokens of the user input data as Income, Account, and Date, respectively.

A slot, as referred to herein, generally relates to a defined segment of user input data (e.g., user query or user command) that may include one or more data elements (e.g., terms, values, characters, media, etc.). Accordingly, the slot identification engine 130 may function to decompose a query or command into defined, essential components that implicate meaningful information to be used when generating a response to the user query or command.

A slot label which may also be referred to herein as a slot classification label may be generated by the one or more slot classification deep machine learning models of the engine 130. A slot label, as referred to herein, generally relates to one of a plurality of slot labels that generally describes a slot (or the data elements within the slot) of a user query or user command. The slot label may define a universe or set of machine or program-comprehensible objects that may be generated for the data elements within an identified slot.

Like the competency classification engine 120, the slot identification engine 120 may implement a single deep machine learning algorithm or an ensemble of deep machine learning algorithms. Additionally, the slot identification engine 130 may be implemented by the one or more computing servers, computer processors, and the like of the artificial intelligence virtual assistance platform 110.

The machine learning models and/or the ensemble of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering, semi-supervised learning), reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, $C_{4-5}$, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial least squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in implementing the artificially intelligent virtual assistant and/or other components of the system 100.

The slot value extraction unit 135 functions to generate slot values by extracting each identified slot and assigned slot label of the user query or user command and converting the data elements (i.e., slot data) within the slot to a machine or program-comprehensible object or instance (e.g., term or value); that is, the slot label is mapped to coding or data that a computer or program of the system 100 comprehends and is able to manipulate or execute processes on. Accordingly, using the slot label generated by the slot identification engine 130, the slot extraction unit 135 identifies a set or group of machine or program-comprehensible objects or instances that may be applied to slot data of a slot assigned with the slot label. Thus, the slot extraction unit 135 may convert the slot data of a slot to a machine or program-comprehensible object (e.g., slot values) based on the slot label and specifically, based on the available objects, instances, or values mapped to or made available under the slot label.

The observables extractor 140 functions to use the slot values comprising the one or more program-comprehensible objects generated at slot extraction unit 135 to determine or generate one or more handlers or subroutines for handling the data of or responding to the user query or user command of user input data. The observables extractor 140 may function to use the slot values provided by the slot extraction unit 135 to determine one or more data sources relevant to and for addressing the user query or the user command and determine one or more filters and functions or operations to apply to data accessed or collected from the one or more identified data sources. Thus, the coding or mapping of the slot data, performed by slot extraction unit 135, to program-comprehensible objects or values may be used to specifically identify the data sources and/or the one or more filters and operations for processing the data collected from the data sources.

The response generator 150 functions to use the competency classification label of the user input data to identify or select one predetermined response template or one of a plurality of predetermined response templates. For each competency classification label of the system 100, the system 100 may have stored a plurality of response templates that may be selected by the response generator 150 based on an identified competency classification label for user input data. Additionally, or alternatively, the response template may be selected based on both the competency classification label and one or more generated slot values. In such instance, the one or more slot values may function to narrow the pool of response template selectable by the response generator to a subset of a larger pool of response templates to consider the variations in a query or user command identified in the slot values. The response templates may generally a combination of predetermined output language or text and one or more input slots for interleaving the handler outputs determined by the observables extractor 140.

The user interface system 105 may include any type of device or combination of devices capable of receiving user input data and presenting a response to the user input data from the artificially intelligent virtual assistant. In some embodiments, the user interface system 105 receives user input data in the form of a verbal utterance and passes the utterance to the automatic speech recognition unit 115 to convert the utterance into text. The user interface system 105 may include, but are not limited to, mobile computing devices (e.g., mobile phones, tablets, etc.) having a client application of the system 100, desktop computers or laptops implementing a web browser, an automated teller machine, virtual and/or personal assistant devices (e.g., Alexa, Google Home, Cortana, Jarvis, etc.), chatbots or workbots, etc. An intelligent personal assistant device (e.g., Alexa, etc.) may be any type of device capable of touchless interaction with a user to performing one or more tasks or operations including providing data or information and/or controlling one or more other devices (e.g., computers, other user interfaces, etc.). Thus, an intelligent personal assistant may be used by a user to perform any portions of the methods described herein, including the steps and processes of method 200, described below. Additionally, a chatbot or a workbot may include any type of program (e.g., slack bot, etc.) implemented by one or more devices that may be used to interact with a user using any type of input method (e.g., verbally, textually, etc.). The chatbot or workbot may be embedded or otherwise placed in operable communication and/or control of a communication node and thus, capable of performing any process or task including, but not limited to, acquiring and providing information and performing one or more control operations.

Figure 1A:
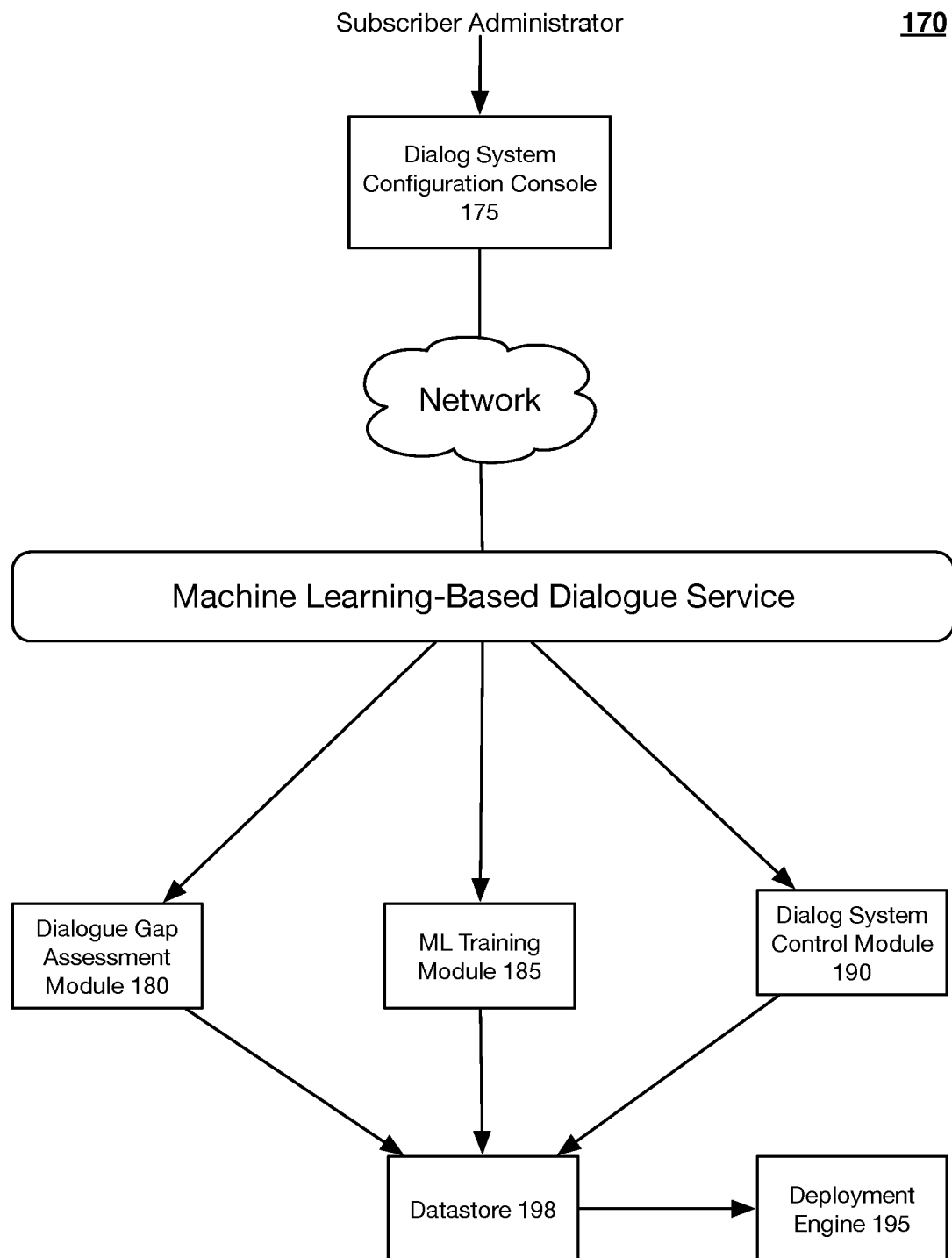
FIG. 1A illustrates a schematic representation of a sub-system of system 100 in accordance with one or more embodiments of the present application.

As shown in FIG. 1A, a subsystem 170 for intelligently configuring a machine learning-based dialogue system of a subscriber to a machine learning-based dialogue service includes a dialogue system configuration and management console 175, a dialogue gap assessment module 180, a machine learning training module 185, a dialogue system control module 190, a dialogue system deployment engine 195, and a datastore 198.

The dialogue system configuration and management console 175 preferably enables a remote user and/or administrator of a subscriber or the like to access, over a network (e.g., the Internet), one or more components and/or applications (including programs) of the system 100 for designing and/or configuring one or more aspects of a dialogue system of the subscriber. In one embodiment, the console 175 may include a subscriber (user) interface, such as a client browser or a client application, that enables a subscriber to interact with the one or more system or application components of the system 100. In some embodiments, the subscriber interface comprises a programmatic interface that may be implemented with one or more application programming interfaces that operable interact with and/or enable a configuration of any aspect or component of a machine learning-based automated dialogue system or the like. Additionally, or alternatively, the subscriber interface may include a graphical user interface (e.g., a web-based interface) or the like.

The dialogue gap assessment module 180 preferably enables a subscriber to perform an assessment of an existing dialogue system of the subscriber or of an intended dialogue system of the subscriber to determine gaps in dialogue capabilities and/or dialogue requirements/needs of the existing or intended dialogue system of the subscriber, as described in more detail below in the one or more methods disclosed herein.

The machine learning training module 185 of the subsystem 170 may function to enable a subscriber to configure one or more machine learning models for performing one or more dialogue handling-related tasks and/or source and configure training data sets for enabling the one or more machine learning models.

The dialogue system control module 190 preferably functions to enable a subscriber to create and/or configure a control structure for controlling/implementing a machine learning-based dialogue system of the subscriber. For instance, in one or more embodiments, the dialogue system control module 190 may enable a construction of a dialogue system control structure, that when executed, causes an implementation of an automated conversational agent of a dialogue system of a subscriber.

The dialogue system deployment engine 195 preferably functions to access one or more dialogue system configuration parameters of a dialogue system of a subscriber and implement an automated conversational agent along with the dialogue system of the subscriber. In some embodiments, the dialogue system configuration parameters may include one or more of a dialogue system control structure of a dialogue system of a subscriber, data sources of a subscriber (e.g., bank account data, patient health records, etc.), business logic for executing computations and/or user-specific data retrieval and/or transformations, training data corpora, and the like. In one embodiment, the one or more dialogue system configuration parameters may be stored in the datastore 198 in association with an account for the subscriber. Preferably, the datastore 198 enables the system 100 to host a plurality of distinct accounts for a plurality of distinct subscribers to the system/service 100.

It shall be noted that any module and/or system component herein including, but not limited to, the dialogue gap assessment module 175, the machine learning training module 180, the dialogue system control module 185, and/or the like may be executed by a distributed one or more computers, one or more computing servers, one or more computer processors implemented by the system 100. Additionally, or alternatively, any or each of the modules described herein may be executed by one or more processors, one or more computers, and/or by a distributed computing system or the like.

2. Method for Intelligently Configuring and Implementing a Machine Learning-Based Control Structure of a Machine Learning-Based Dialogue System As shown in FIG. 2, a method 200 for constructing and deploying a graphical machine learning classification control network for an artificially intelligent dialogue system includes configuring a root node S210, configuring one or more state nodes S220, configuring a plurality of graphical connections (graphical edges) between nodes S230, deploying the graphical machine learning classification control network in a live artificially intelligent dialogue system S240. Optionally, configuring logic operations within the graphical machine learning classification control network S235.

Generally, the method 200 may function to enable a configuration or construction of conversational system control flow for a machine learning-based dialogue system. The conversational system control flow may include an identification of a plurality of machine learning classifiers networked and/or mapped together with graphical edges and/or transitions for executing logic and variable dialogue data. Because the method 200 enables intelligent construction of a conversation system control flow, a system (e.g., system 100) implementing the method 200 may function to intuitively guide dialogue between a user and a virtual dialogue agent in a highly conversational, uninterrupted, and intelligent manner while resolving an underlying purpose of the dialogue.

It shall be noted that while, in one or more embodiments, in which a graphical user interface (GUI) may be used in construction the dialogue system control structure, the graphical edges may have a visually perceptible construct within the GUI, in other embodiments, some features of a dialog system control structure, such as the edge connections, may be represented and/or enabled using computer code or scripts (e.g., via an API or the like). That is, any feature of the dialogue system control structure that may be constructed and/or assembled using a GUI may also be represented and/or constructed using an API or other programmatic interface.

S210, which includes configuring a root node, preferably includes setting or positioning a graphical representation of a root classification node in a control structure and configuring one or more operations of the root classification node within a graphical machine learning classification control network. The root classification node preferably functions as an initial dialogue competency or dialogue intent classifier of conversational data or utterance data obtained from a user interfacing with a dialogue system implementing the method 200. That is, at an outset (e.g., application initialization, etc.) of a conversational interaction between a user and a dialogue system implementing the method 200, the root classification node operates to receive conversational data or input (e.g., verbal input, textual input, etc.) and responsively, processes the initial conversational data or input to generate one or more competency classifications (labels) or one or more intent classifications (labels) based on the conversational data or input and correspondingly, direct the conversation between the user and the machine learning-based dialogue system to a sub-network of state classification nodes or a single state classification node (as discussed in more detail below) that is able to handle the conversation based on the competency classification label.

Additionally, or alternatively, the root classification node may operate to re-classify an ongoing or present conversation between a user and a dialogue system implementing the method 200 based on additional or subsequent conversational data obtained from the user. That is, in some embodiments, S210 may function to use the root classification node to generate a secondary or subsequent competency classification label midstream a conversation between a user and a dialogue agent and/or the like. In such embodiments, S210 may function to implement the root classification node to generate a second distinct competency classification label that operates to move a conversation between a user and a dialogue agent from a first sub-network of state nodes associated with a first competency classification label to a second sub-network of state nodes associated with the second or subsequent competency classification label generated by the root classification node. Effectively, a reclassification by the root classification node may be triggered by an inability of a sub-network of state nodes associated with an initial competency classification label to handle or generate a proper response to conversational data or otherwise, if a trajectory of a conversation between the user and a dialogue agent changes towards a different competency or topic of conversation. That is, in some embodiments, midstream a conversation between a user and the machine learning-based dialogue system, S210 may function to determine a misalignment between a dialogue intent competency of a given state dialogue node and a computed dialogue intent of utterance data obtained from the user. In such embodiments, the misalignment in dialogue intent may be based on a shift or a change in the dialogue intent of the user away from a prior dialogue intent that matched the current or present state dialogue classification node. In another instance, S210 may function to generate a dialogue classification prediction and associated intent probability match/ confidence level that may be below a dialogue intent threshold associated with the present or current state dialogue classification node. It shall be noted that a reversion to the root dialogue classification node from a state dialogue classification node may be achieved in any suitable manner including, but not limited to, based on a computed misalignment in dialogue intent, an explicit request by the user (e.g., "start over", new topic request, etc.), exceeding a capability of a current or present state dialogue classification node, and/or the like. Additionally, it shall be noted that root node may function to support competency and/or intent classification of conversational input data from any state, including but not limited to, at a completion of a conversation on a topic or competency, a change of topic and/or a conversation between multiple competencies, and/or the like.

In a preferred embodiment, one or more competency and/or intent classification capabilities of the root classification node are enabled using one or more machine learning classifiers. In one implementation, the root classification node may be implemented by and/or expressly configured with an ensemble of machine learning classifiers capable of returning one or more distinct machine learning (competency) classification labels based on (vector) features (e.g., conversational data) extracted from conversational input of a user to a dialogue system implementing the method 200.

In this implementation, the ensemble of machine learning classifiers may include a plurality of distinct machine learning classifiers working in concert or independently to generate competency classification labels or predictions for given conversational data input. For instance, the ensemble of machine learning classifiers may include five distinctly trained machine learning classifiers in which each of the five machine learning classifiers defining the ensemble may be specifically trained to classify conversational data for a single competency or intent classification label and correspondingly, generate the distinct competency or intent classification label. It shall be noted that the ensemble of machine learning classifiers may include any number of machine learning classifiers capable of returning or generating any number of machine learning classification labels based on input of conversational data.

In another implementation, the root classification node may be implemented by and/or expressly configured with a single combinational machine learning classifier that is trained to return or generate one of a plurality of distinct competency or intent classification labels or predictions based on features extracted from conversational input of a user to a dialogue system implementing the method 200. That is, the single combination machine learning classifier may be specifically trained to detect all or any type of competency or intent that is comprehensible by a dialogue system. For example, the single combinational machine learning classifier may be trained and/or configured to detect five distinct competencies and/or distinct intents of a user based on input of conversational data. In such example, the single combinational machine learning classifier may function to output a single competency classification label selected from a plurality of distinct competency labels for which the single combination machine learning classifier is trained. Additionally, or alternatively, the single combinational machine learning classifier may function to output multiple distinct competency classification labels together with a probability of match of competency or classification intent for each of the multiple distinct competency classification labels that is output.

Additionally, S210 may function to configure the root classification node to extend to a plurality of distinct state classification nodes and/or sub-networks of state classification nodes. That is, in some embodiments, S210 may function to communicatively connect the root classification node to each of a plurality of distinct state classification nodes and/or sub-networks of state classification nodes. In this way, the root classification node may function to drive or guide a conversation between a user and a dialogue system implementing the method 200 by directing conversational input data along a connection or a path to a respective state classification node and/or sub-network of state classification nodes based on a competency classification and/or intent classification label generated at the root classification node. That is, the competency classification or intent classification label produced at the root classification node may preferably be used to govern a conversational direction along one or more available dialogue communication paths within the graphical machine learning classification control network.

It shall be noted that any suitable and/or state node described herein may be additionally or alternatively configured in a similar manner as a root classification node with single machine learning model with a combination of machine learning models, such as ensemble of machine learning models, acting in concert to classification data based on conversational input data from a user.

Additionally, or alternatively, the dialogue system control structure may include a plurality of competency nodes (i.e., state nodes) of which a subset of the competency nodes may be graphically connected to the root node. Preferably, each (state/competency) node within the dialog system control structure may be configured to perform one or more classification tasks and/or one or more inferential tasks based on utterance input and one or more logical operations based on one or more logical annotations associated with a given node. Each graphical edge between two distinct nodes may preferably function to execute a logic function and/or variable dialogue data function based on a classification task, an inferential task, and/or operation of a first node of a pair of connected nodes.

S220, which includes configuring state nodes, preferably includes defining and/or constructing one or more state dialogue classification nodes in a dialogue system control structure and configuring one or more operations of the one or more state classification nodes within a graphical machine learning classification control network.

Preferably, each of the one or more state classification nodes is configured to perform a distinct classification task based on conversational data input. That is, in a preferred embodiment, each of the one or more state classification nodes may function to implement or be operated with one or more distinctly trained machine learning classifier. Accordingly, depending on a conversational flow between a user and a dialogue system implementing the method 200, S220 may function to implement and/or operate one or more of the state classification nodes to generate one or more machine learning classification labels based on conversational data input obtained or derived from a conversation involving a user.

As mentioned previously, the method 200 may include implementing one or more distinct sub-network of state nodes. Accordingly, in some embodiments, S220 may function to compose a collection and/or combination of state classification nodes to thereby defined a sub-network of state nodes. Preferably, each distinct sub-network of state nodes may function to enable conversation within a dialogue system for at least one competency. In such preferred embodiments, each sub-network may include a progenitor node which preferably relates to a coarse competency and/or area of aptitude of a dialogue system. For instance, the progenitor node may include a broad category such as finance.

Figure 3:
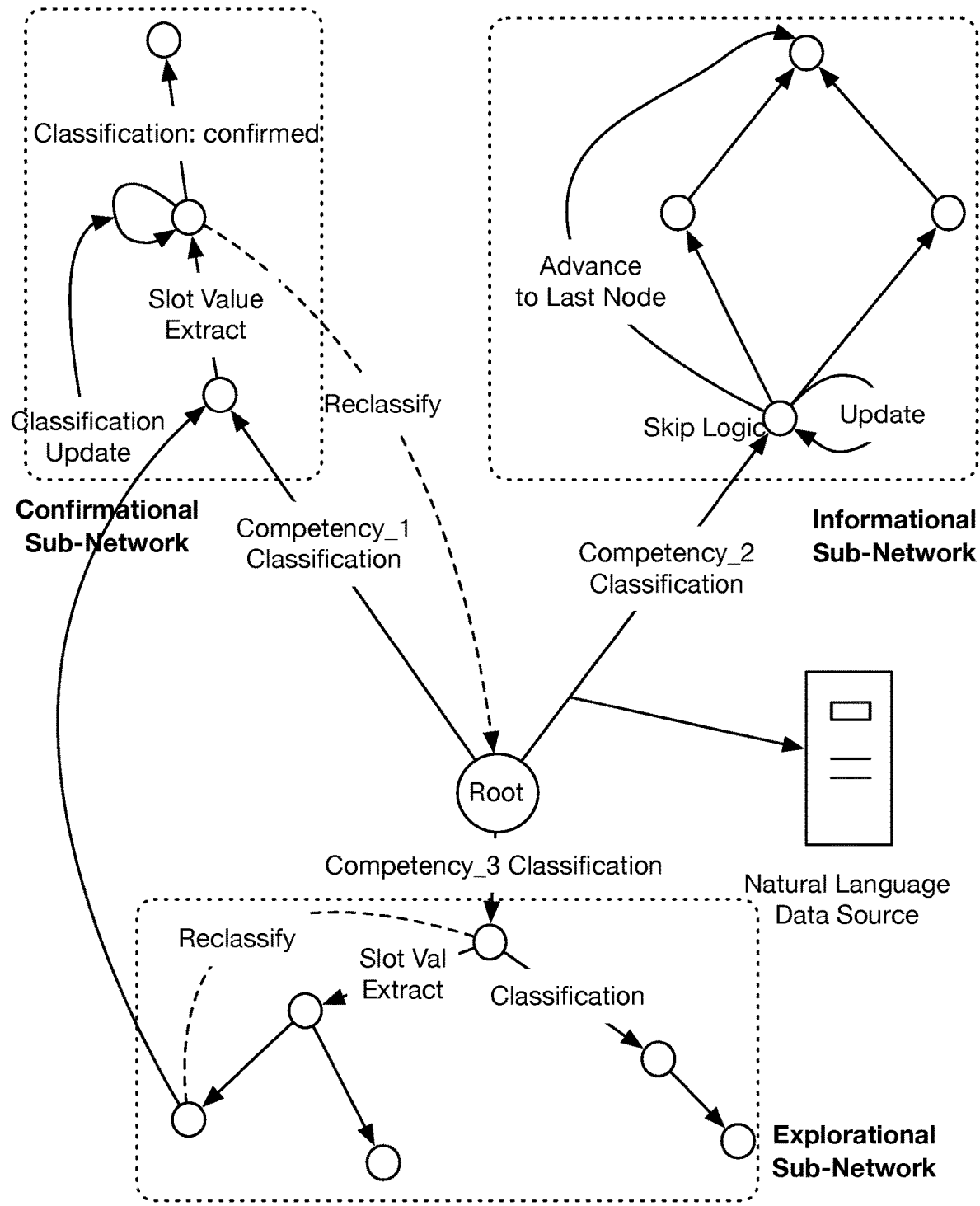
FIG. 3 illustrates a schematic representation of an example control network for controlling a machine learning-based dialogue system in accordance with one or more embodiments of the present application.
Figure 4:
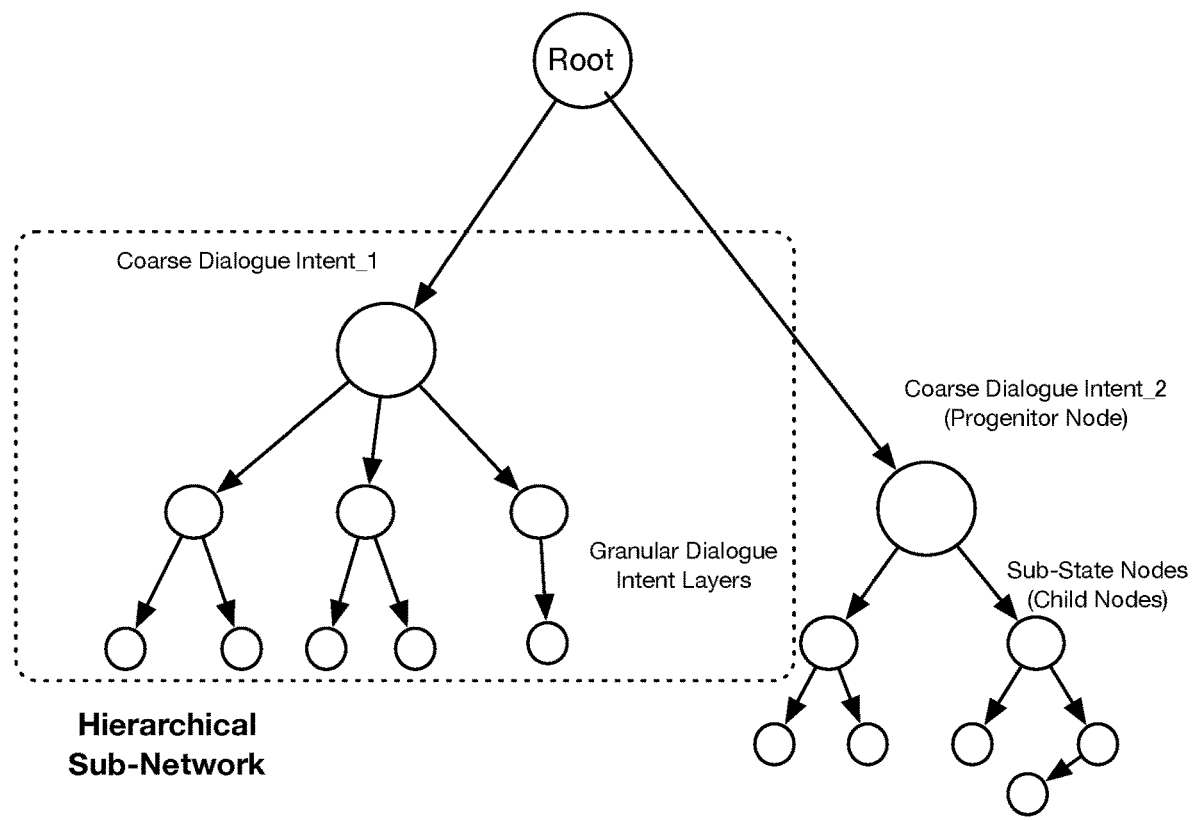
FIG. 4 illustrates a schematic representation of a hierarchical sub-network of state classification nodes for a machine learning-based dialogue system in accordance with one or more embodiments of the present application.

Each sub-network of state nodes may have a hierarchical structure in which the progenitor node is the higher most layer of the hierarchy and sub-state nodes (child nodes) define one or more layers below the progenitor node, as shown by way of example in FIGS. 3-4. In such a hierarchical architecture, the progenitor node may include a distinct competency and/or state dialogue classification node that covers a broad or coarse dialogue intent (e.g., Finance dialogue intent, Finance category, etc.) and each of the sub-state nodes that follow may function to perform granular dialogue classifications for one distinct dialogue intent (e.g., payments, balances, spending history, etc.) that may be covered by or define part of the coarse dialogue intent.

Preferably, each sub-network includes a single progenitor node that may be directly and/or operably connected via a graphical edge connection to a root node of a graphical dialogue system control structure.

It shall be noted that the graphical dialog system control structure may be modified and/or augmented to include any number of distinct sub-networks as a dialog system implementing the method 200 or the like evolves. For instance, as new broad and/or coarse dialog competencies are identified by a dialogue system or the like, new sub-networks may be created and added to an existing graphical dialog system control structure thereby evolving the control structure.

In some embodiments, a single state classification node may be implemented with or used to operate a single machine learning classifier. In another embodiment, a single state classification node may be implemented with or used to operate a plurality and/or an ensemble of machine learning classifiers. In an implementation in which a state classification node is implemented with or used to operate a plurality of distinct machine learning classifiers, the state classification node may function to generate a plurality of distinct machine learning classification labels using the plurality of distinct machine learning classifiers responsive to conversational data input.

In a preferred embodiment, S220 may function to configure one or more distinct networks of distinct state classification nodes. In such embodiment, a single network of state classification nodes preferably includes two or more distinct state classification nodes that are configured to be in operational communication. The network of state classification nodes may function to classify conversation data according to a distinct conversational competency of a dialogue system implementing the method 200. Accordingly, S220 may function to configure a plurality of distinct networks of state classification nodes in which each of the plurality of distinct state classification nodes is configured to perform classification tasks according to one distinct competency (e.g., dialogue domain or area of aptitude) of a dialogue system implementing the method 200.

Additionally, or alternatively, each distinct network of state classification nodes may extend from the root classification node. That is, each distinct network of state classification nodes may have a direct communication path from the root classification node. In some embodiments, a distinct network of state classification nodes may be activated or placed into classification operation based on receiving a competency classification label, conversational data, and/or an activation signal from the root classification node via the communication path. In such embodiments, other distinct competency classification nodes of a dialogue system implementing the method 200 may remain in a dormant and/or an inactive state (or deactivated state based on competency classification prediction). In operation, a dialogue system implementing the method 200 preferably functions to operate or activate a single network of state classification nodes at a time; however, it shall be noted that in the circumstance a conversation flow between a dialogue agent or the like of the dialogue system involves more than one dialogue competency or dialogue intent, the dialogue system may function to operate multiple distinct networks of state classification nodes in parallel to enable a dialogue between the user and the dialogue system to shift between distinct networks of the dialogue system control structure.

In a preferred conversation flow, a network (or sub-network) of state classification nodes may be placed into operation based on root input from a root classification node. Alternatively, in some embodiment, a network of state classification nodes may be placed into operation based on input from a lateral or distinct network of state classification node of a dialogue system implementing the method 200. In such embodiments, a first network of state classification nodes tasked by the root classification node with handling a conversational flow between a user and a dialogue agent may function to pass conversational and/or classification data laterally to a second distinct network of state classification nodes that may be better suited to handle conversational data from a user. In such embodiments, the conversation or dialogue between the user and the dialogue system may perform a jump or lateral leap (i.e., a transfer) from a first distinct network to a second distinct network of the dialogue system control network. That is, a dialogue system implementing the method 200 may function to jump or send an active dialogue between a user and the dialogue system to a second distinct network from a first distinct network based on a misalignment between a dialogue intent of an utterance from a user and dialogue intent classification capabilities of the one or more dialogue classification nodes within a first distinct dialogue classification sub-network. In a preferred embodiment, when the computed misaligned is determined to include a dialogue intent of the user that is within a scope of another sub-network, the dialogue system implementing the method 200 may function to pass the dialogue handling responsibilities from a first distinct sub-network having the misalignment to a second sub-network in which the dialogue intent of the user may be aligned with at least one classification node with the sub-network.

This type of lateral move between two distinct networks may be considered a jump or a lateral leap because, in such embodiments, there may not be a bridge or a graphical transitional edge that explicitly connects the first distinct network to the second distinct network. While each of the first distinct network and the second distinct network may be impliedly connected with a root dialogue classification node, in one or more embodiments, there may not be a direction connection or a direct path between a state dialogue classification node in the first distinct network to a state dialogue classification node in the second distinct network.

In a preferred embodiment, each of the dialogue networks of a dialogue system may be configured according to one of a plurality of distinct conversational archetypes. For instance, in some embodiments, S220 may function to set or configured each network of state classification nodes as an informational archetype, a confirmational archetype, or an explorational archetype. Each distinct archetype may be designed or configured to achieve a different conversational objective of a dialogue system.

As an example, S220 may function to configure a network of state classification nodes according to the informational archetype. Accordingly, a conversational objective of the network of state classification nodes when configured according to an informational archetype may include providing information or other data in a conversational response by a dialogue system responsive to one or more queries and/or commands from a user. In such embodiments, one or more of the state classification nodes that may be configured according to the informational archetype may be mapped to one or more data sources that enables the one or more state classification nodes to handle a user query and/or user command for information.

As another example, S220 may function to configure a network of state classification nodes according to the confirmational (executional) archetype. Accordingly, a conversational objective of the network of state classification nodes when configured as a confirmational archetype may include executing one or more actions against an account associated with a user or executing some action against some data source based on conversation input from a user. In such embodiments, one or more of the state classification nodes that may be configured according to the confirmational archetype may be configured with executional authorities that enables one or more of the state classification nodes to create an account and/or execute some action against some data source based on conversational input from a user.

As another example, S220 may function to configure a network of state classification nodes according to the explorational (executional) archetype. Accordingly, a conversational objective of the network of state classification nodes when configured as an explorational archetype may include enabling a user to explore a variety of related competencies and/or topics, preferably associated with a sub-network of nodes) in an effort to provide a tailored and/or pointed response for resolving a user query, user command, and/or the like associated with conversational input from the user.

S230, which includes configuring a plurality of (graphical) connections (graphical edges) between and/or to state nodes, may function to configure and/or build operational connections between and/or to state classification nodes that define one or more operations or actions computed between and/or to state classification nodes in the graphical machine learning classification control network. That is, in a preferred implementation in which the machine learning classification control network is illustrated with a graphical representation, the plurality of connections may each be represented as graphical edges and/or graphical transitions between state nodes or a graphical transition that loops back into a given state node.

Preferably, S230 includes identifying and/or building each of the plurality of connections as one or more of a classification transition, a slot transition, an update transition, and/or the like.

A classification transition (or edge) preferably relates to a transition between at least a pair of state nodes that denotes that a machine learning classification label was generated by a first state node or originating node which may be passed to a second state node as an input or the like or that enables an active dialogue between a user and the dialogue system to pass to a destination node in the pair of state nodes. The classification transition may typically be represented as a graphical arrow or line extending from a first state node to a second state node within the graphical machine learning classification control network. The graphical representation of the classification transition may additionally or alternatively include annotations that describe an operation of the classification transition and that may function to link a state node to a data corpus, a reference data source, and/or any suitable computing resource.

A slot transition (or edge) preferably relates to a transition between at least a pair of state nodes that denotes that one or more slot values may have been extracted from conversational data generated based on user input (e.g., a user query, user command, etc.). The slot transition may typically be represented as a graphical arrow or line extending from a first state node to a second state node within the graphical machine learning classification control network. The graphical representation of the slot transition may additionally or alternatively include annotations that describe an operation of the slot transition and that may function to link a state node to a data corpus, a reference data source, and/or any suitable computing resource.

An update transition relates to a specific type of classification transition in which the transition connects a pair of state nodes that are both the same state node and/or indicates a loop of new information, a new classification, or the like back into a same state node. That is, in one or more embodiments, an update transition (or edge) preferably relates to a transition that begins at a given state node and reverts back to the state node for purposes of acquiring additional information from a user by the given state node or for indicating that additional information or utterance data acquired from a user interacting with the dialogue system implementing the method 200 may be processed by the given state node for a new or an additional classification or for performing a dialogue action (e.g., generating a response, retrieving data, executing a requested action by the user, etc.). Accordingly, an update transition in some embodiments denotes an action by the dialogue system to obtain additional information from a user, which may include posing a query by a dialogue agent to a user for purposes of collecting additionally required conversational data (e.g., collecting additional slot values) for executing some action by the dialogue system. The update transition may typically be represented as a graphical loop that originates and reverts back to a state node within the graphical machine learning classification control network. The graphical representation of the update transition may additionally or alternatively include annotations that describe an operation of the update transition.

It shall be noted that while S230 may function to configure the one or more transitions of a machine learning classification control network as one or more a classification transition, a slot transition, and/or an update transition, the method 200 may function to implement any suitable and/or type of transition between and/or to state nodes within the control network. For instance, S230 may additionally configure one or more of the transitions of the control network to include re-classifying transitions that operate to revert or move conversational data out of a network of state classification nodes to the root classification node in order to re-classify the conversational data to another competency or the like. In another example, S230 may function to configure one or more of the transition of the control network to include multi-hop transitions which may function to skip one or more state nodes of an ordered conversational flow of the control network. That is, in some embodiments, based on conversational data and the one or more operations performed at a state node, a multi-hop transition may be triggered that enables the conversational data and/or conversational flow to skip one or more (intermediate) downstream nodes to another state node because one or more operations of the one or more (intermediate) downstream nodes may have been satisfied prematurely at an upstream or prior state node.

Optionally, S235, which includes configuring logic transitions (e.g., business logic transitions), may function to configure or build one or more logical transitions between two or more state nodes of the machine learning classification control network. The one or more logic transitions may include any suitable, business, or other useful heuristic that enables and/or adds efficiency to a conversational flow between a user and a dialogue system implementing the method 200 and enables an execution or completion of one or more business tasks for responding to conversational input from the user.

In one example, S235 may configure one or more logic transitions and/or logic annotations that enable a conversational flow to move or jump to disparate (unconnected) sections of a network of state classification nodes (e.g., some active annotations enable an active dialogue to jump multiple nodes), such that even if there is no recognized transition between two state nodes or two distinct networks of state classification nodes, the logic transition when executed can move the conversational flow to a second of the two state nodes or the two distinct networks. In another example, S235 may configure one or more logic transitions that enable the control network to interface with one or more external systems, external data sources, external resources, and/or the like. For instance, the logic transitions may function to execute application programming interface (API) calls for obtaining data and/or the like from an external or remote resource.

S240, deploying the graphical machine learning classification control network in a live artificially intelligent dialogue system, may function to implement the graphical machine learning control network as a primary operational control structure for implementing a live conversation between one or more users and a virtual (digital) dialogue agent of a dialogue system implementing the method 200. That is, the graphical machine learning classification control network may function to operate as a de facto brain of an artificially intelligent dialogue agent of the dialogue system. For instance, in a preferred embodiment, the dialogue system using or implementing the graphical machine learning classification control network may function to conduct and/or handle one or more live conversations between real-world users and a virtual dialogue agent of the dialogue system. Accordingly, the graphical machine learning classification control network may be used to conduct a live conversation with a user until a disposition, completion, and/or termination of the conversation between the user and a virtual dialogue agent.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed:

1. A method of constructing an automated dialogue control system structure for controlling a machine learning-based automated dialogue system, the method comprising:
   constructing, via a user interface, an automated dialogue system control structure that controls one or more operations of a machine learning-based automated dialogue system, wherein the constructing comprises:
      constructing a first graphical component a root dialogue classification node based on user interface input, wherein the root dialogue classification node performs a dialogue intent classification task for utterance data input of an active dialogue between a user and the machine learning-based automated dialogue system, wherein the root dialogue classification node predicts a first dialogue intent classification for the active dialogue based on the utterance data input;
      constructing a plurality of second graphical components a plurality of distinct dialogue state classification nodes downstream of the root dialogue classification node based on the user interface input, wherein each of the plurality of distinct dialogue state classification nodes performs a distinct dialogue classification task for a distinct dialogue intent based on the utterance data input of the active dialogue;
      constructing one or more edge connections between the root dialogue classification node and a subset of the plurality of distinct dialogue state classification nodes that connects each of the subset of the plurality of distinct dialogue state classification nodes to the root dialogue classification node thereby enabling a dialogue path from the root dialogue classification node downstream to each of the subset of the plurality of distinct dialogue state classification nodes;
      annotating one or more distinct executable logic instructions, wherein the annotating includes adding executable logic instructions at one dialogue state classification node of the plurality of distinct dialogue state nodes that, when executed, causes an evaluation of a computed confidence level associated with a dialogue intent classification prediction by the one dialogue state classification node against a dialogue intent threshold, wherein when the computed confidence level does not satisfy the dialogue intent threshold:
         (a) the one dialogue state classification node reverts the active dialogue to the root dialogue classification node, and
         (b) the root dialogue classification node predicts a new dialogue intent classification for the active dialogue based on the utterance data input;
      constructing one or more edge connections between the root dialogue classification node and a subset of the plurality of distinct dialogue state classification nodes that connects each of the subset of the plurality of distinct dialogue state classification nodes to the root dialogue classification node thereby enabling a dialogue path from the root dialogue classification node downstream to each of the subset of the plurality of distinct dialogue state classification nodes,
   wherein in response to receiving the utterance data, the automated dialogue control structure is executed to control the one or more operations of the machine learning-based automated dialogue system.

2. The method according to claim 1, wherein
the root dialogue classification node comprises a single machine learning model that is trained to perform multiple distinct dialogue intent classification tasks that produces an intent classification prediction based on the input of the utterance data that aligns with a distinct dialogue intent competency of one of the plurality of distinct dialogue state classification nodes downstream of the root dialogue classification node.

3. The method according to claim 2, further comprising:
passing the active dialogue between the user and the machine learning-based automated dialogue system from the root dialogue classification node downstream to a distinct one of the plurality of distinct dialogue state classification nodes based on the dialogue intent classification prediction of the root dialogue classification node.

4. The method according to claim 1, wherein
the root dialogue classification node comprises an ensemble of distinct machine learning models, each of the distinct machine learning models being trained to perform a distinct dialogue intent classification tasks, wherein the ensemble produces multiple distinct intent classification predictions including a distinct dialogue intent classification prediction for each one of the plurality of distinct dialogue state classification nodes downstream of the root dialogue classification node.

5. The method according to claim 4, further comprising:
passing the active dialogue between the user and the machine learning-based automated dialogue system from the root dialogue classification node downstream to a distinct one of the plurality of distinct dialogue state classification nodes based on identifying which distinct dialogue intent classification prediction as having a highest level of confidence.

6. The method according to claim 1, wherein
the one dialogue state classification node reverts the active dialogue to the root dialogue classification node based on computing a misalignment between dialogue intent capabilities of the one dialogue state classification node and an identified current dialogue intent of the utterance data from the user.

7. The method according to claim 1, further comprising:
a plurality of distinct dialogue competency sub-networks, wherein each of the plurality of distinct dialogue competency sub-networks:
   (i) separately extends from the root dialogue classification node via one graphical edge connection,
   (ii) includes a progenitor node comprising a distinct one of the plurality of distinct dialogue state classification nodes, wherein one or more sub-dialogue intent nodes are arranged downstream and extend from the progenitor node.

8. The method according to claim 7, wherein
each of the plurality of distinct dialogue competency sub-networks have a hierarchical structure in which:
   the progenitor node defining a top layer of the hierarchical structure is configured with coarse capabilities to perform dialogue intent classification tasks for generating predictions identifying one or more multiple distinct sub-intents of a single dialogue competency or single dialogue category, the one or more sub-dialogue intent nodes defining one or more subsequent layers from the progenitor node is configured with granular capabilities to perform dialogue intent classification for at least a distinct one of the multiple distinct sub-intents.

9. The method according to claim 7, further comprising: when a misalignment between a computed dialogue intent classification of utterance data of a user and a dialogue classification capability of a sub-dialogue intent classification node of a first distinct sub-network of the plurality of distinct dialogue competency sub-networks is detected, executing logic instructions annotated to the first distinct sub-network causing the machine learning-based automated dialogue system to pass the active dialogue, in a jumping manner, directly from the first distinct sub-network to a second distinct sub-network that is not connected to the first distinct sub-network with a graphical edge connection having the dialogue classification capability matching the dialogue intent of the user.

10. The method according to claim 1, further comprising: constructing a classification transition edge connection, wherein the classification transition edge connection relates to a graphical transition connection between at least a pair of distinct dialogue state classification nodes indicating that a machine learning classification prediction has been generated by an originating node of the pair that causes the active dialogue between the user and the machine learning-based automated dialogue system to pass from the originating node to a destination node of the pair.

11. The method according to claim 1, further comprising: constructing a slot transition edge connection, wherein the slot transition edge connection relates to a graphical transition connection between at least a pair of distinct dialogue state classification nodes indicating that one or more slot classification values of the active dialogue between the user and the machine learning-based automated dialogue system which are passed pass from an originating node to a destination node of the pair.

12. The method according to claim 1, further comprising: constructing an update transition loop connection, wherein the update transition loop connection relates to a graphical transition connection that graphically originates at a distinct state classification node and that loops back into the distinct dialogue state classification node indicating an action to be performed by the distinct state classification node for obtaining additional information beyond an initial utterance from the user to the distinct state classification node.

13. The method according to claim 1, further comprising: constructing a logic transition edge connection, wherein the logic transition edge connection relates to a graphical logical transition connection between at least a pair of distinct dialogue state classification nodes that causes an execution or a completion of one or more business tasks for generating a response to dialogue input from the user.

14. The method according to claim 1, further comprising: setting an archetype that is selected from a plurality of distinct archetypes for each of one or more new dialogue competencies of a target dialogue system based on attributes of mishandled utterance data within a target corpus of mishandled utterances of one or more distinct corpora of mishandled utterances.

15. The method according to claim 1, further comprising: deploying the automated dialogue system control structure to control the operation of each of the root dialogue classification node and each of the plurality of distinct dialogue state classification nodes for implementing an artificially intelligent dialogue agent that interfaces with the user in the active dialogue.

16. A system for intelligently configuring a graphical control structure for controlling a machine learning-based automated dialogue system, the system comprising:

a distributed network of computers that implement a machine learning-based automated dialogue system;

a web-based user interface for constructing a graphical dialogue system control structure that, when executed, controls one or more operations of the machine learning-based automated dialogue service and that:

constructs a root dialogue classification node based on user interface input, wherein the root dialogue classification node performs a dialogue intent classification task for utterance data input of an active dialogue between a user and the machine learning-based automated dialogue system, wherein the root dialogue classification node predicts a first dialogue intent classification for the active dialogue based on the utterance data input;

constructs a plurality of distinct dialogue state classification nodes that are arranged downstream of the root dialogue classification node based on the user interface input, wherein each of the plurality of distinct dialogue state classification nodes performs a distinct dialogue classification task for a distinct dialogue intent based on the utterance data input of the active dialogue;

annotates one or more distinct executable logic instructions, wherein the annotating includes adding executable logic instructions at one dialogue state classification node of the plurality of distinct dialogue state nodes that, when executed, causes an evaluation of a computed confidence level associated with a dialogue intent classification prediction by the one dialogue state classification node against a dialogue intent threshold, wherein when the computed confidence level does not satisfy the dialogue intent threshold:

(a) the one dialogue state classification node reverts the active dialogue to the root dialogue classification node, and (b) the root dialogue classification node predicts a new dialogue intent classification for the active dialogue based on the utterance data input;

constructs one or more graphical edge connections between the root dialogue classification node and a subset of the plurality of distinct dialogue state classification nodes that graphically connects each of the subset of the plurality of distinct dialogue state classification nodes to the root dialogue classification node thereby enabling a dialogue path from the root node downstream to each of the subset of the plurality of distinct dialogue state classification nodes, wherein in response to receiving the utterance data input, the distributed network of computers executes the graphical dialogue system control structure that controls the one or more operations of the machine learning-based automated dialogue system.

17. The system according to claim 16, wherein the graphical dialogue system control structure further includes:
a plurality of distinct dialogue competency sub-networks, wherein each of the plurality of distinct dialogue competency sub-networks:
(i) separately extends from the root dialogue classification node via one graphical edge connection,
(ii) includes a progenitor node comprising a distinct one of the plurality of distinct state dialogue classification nodes, wherein one or more sub-dialogue intent nodes are arranged downstream and extend from the progenitor node.

* * * * *